United States Patent
Pack

(10) Patent No.: US 10,820,036 B1
(45) Date of Patent: Oct. 27, 2020

(54) SYSTEM AND METHOD FOR ESTABLISHING AND CONTROLLING A DIRECT VIDEO OUTPUT FEED FROM A SELECTED REMOTE DEVICE

(71) Applicant: Avery Pack, Dania Beach, FL (US)

(72) Inventor: Avery Pack, Dania Beach, FL (US)

( * ) Notice: Subject to any disclaimer, the term of this patent is extended or adjusted under 35 U.S.C. 154(b) by 0 days.

(21) Appl. No.: 16/676,132

(22) Filed: Nov. 6, 2019

(51) Int. Cl.
*H04N 21/4227* (2011.01)
*H04N 21/422* (2011.01)
*H04N 21/436* (2011.01)

(52) U.S. Cl.
CPC ..... *H04N 21/4227* (2013.01); *H04N 21/4222* (2013.01); *H04N 21/42219* (2013.01); *H04N 21/42222* (2013.01); *H04N 21/43615* (2013.01)

(58) Field of Classification Search
None
See application file for complete search history.

(56) References Cited

U.S. PATENT DOCUMENTS

| 2015/0026714 A1* | 1/2015 | Yuan | H04N 21/25841 725/32 |
| 2019/0104283 A1* | 4/2019 | Wakeyama | H04N 7/183 |

* cited by examiner

*Primary Examiner* — Samira Monshi
(74) *Attorney, Agent, or Firm* — The Keys Law Firm PLLC

(57) ABSTRACT

A system and method for establishing and controlling a direct video output feed from a selected remote device. The system and method employs a requesting handheld device which seeks to view a video feed in specified remote location in real time, a capturing handheld device which desires to allow video captured by its camera to be provided to the requesting handheld device, and a server which facilitates the identification of candidate capturing handheld devices based on the characteristics of the desired video feed and the establishment of a real time session between the requesting handheld device and the capturing handheld device through which the video feed may be provided. Through this configuration, the requesting handheld device is able to request, establish, and exert control of a direct video output feed being captured remotely in real time on the capturing handheld device.

18 Claims, 3 Drawing Sheets

SYSTEM AND METHOD FOR ESTABLISHING AND CONTROLLING A DIRECT VIDEO OUTPUT FEED FROM A SELECTED REMOTE DEVICE

BACKGROUND OF THE INVENTION

Field of the Invention

This invention relates to the selective distribution of a real time interactive video output being on a selected capturing device to a discrete, remote device.

Description of the Prior Art

The design and use of handheld computers, such as smartphones and tablet computers is well established. While handheld computers (which may also be referred to herein as "handheld devices" or "mobile devices") have been around in some form for decades, in recent times they have become much more ubiquitous in many societies around the world. And this increased presence has happened as the hardware, software, and wireless communication capabilities of handheld devices has improved. Nowadays, in addition to having system software as well as general input/output and processing functionality that is present in essentially all computers, modern handheld devices almost always include some form of wireless communication (such as digital cellular network functionality, wireless local area networking functionality and/or personal area networking functionality), some form of camera for capturing images and video, some form of geo-spatial positioning functionality, and various sensors whose outputs can be leveraged by their software.

As the capabilities of modern handheld devices has grown, the uses of such devices has also diversified. While older handheld devices may not have been able to deliver even a reasonable level of photography or videography, it is common now for such devices to be able to be able deliver image and video quality that is comparable to or which exceeds many pocket cameras. Similarly, improvements in the geo-spatial positioning functionality, along with the increased processing power and wireless communication speeds, have allowed modern handheld devices to essentially replace stand-alone satellite navigation devices and paper maps.

Taking advantage of such developments, many services have been introduced that leverage the ubiquity, power, and interconnectivity of handheld devices. Such services often seek to improve productivity, mobility, and/or convenience by facilitating, among other things, coordination between remote users through the users' respective handheld devices. There remains a need, however, for a system and method which allows a requesting user to be provided with a direct real time video feed on their handheld device that is being captured by a selected capturing user at the direction of the requesting user.

SUMMARY OF THE INVENTION

The present disclosure describes a system and method for establishing and controlling a direct video output feed from a selected remote device. The system for establishing and controlling a direct video output feed from a selected remote device employs a method which includes requesting by a first handheld device a remote video feed, wherein the step of requesting includes identifying at least a target and the first handheld device includes a first visual output component; following the step of requesting, establishing a real time communications session between the first handheld device and a remote device, wherein the real time communications session is adapted to allow the transmission of data representing video from the remote device to the first handheld device; generating by the remote device a video feed relating to the target, wherein the step of generating includes capturing video from a camera system on the remote device; following the step of establishing, transmitting by the remote device the video feed in real time to the first handheld device, wherein the step of transmitting utilizes the real time communications session; and as the step of transmitting occurs, displaying by the first handheld device the video feed in real time on the first visual output component.

The method for establishing and controlling a direct video output feed from a selected remote device may additionally include: receiving an adjustment command on the first handheld device, wherein the adjustment command is defined by an intended change to manner in which the video feed is being generated and the remote device includes a second visual output component; displaying on the second visual output component an indicia related to the adjustment command.

It is an object of this invention to provide a system and method which allows a requesting handheld device to request, establish, and exert control of a direct video output feed being captured in real time on a selected remote capturing device.

This and other objects will be apparent to one of skill in the art.

DETAILED DESCRIPTION OF THE INVENTION

Described herein is a system and method for establishing and controlling a direct video output feed from a selected remote device. The system and method employs a requesting handheld device which seeks to view a video feed in specified remote location in real time, a remote capturing device which desires to allow video captured by its camera to be provided to the requesting handheld device, and a server which facilitates the identification of candidate capturing handheld devices based on the characteristics of the desired video feed and the establishment of a real time session between the requesting handheld device and the remote capturing device through which the video feed may be provided. Through this configuration, the requesting handheld device is able to request, establish, and exert control of a direct video output feed being captured remotely in real time on the remote capturing device.

Figure 1:
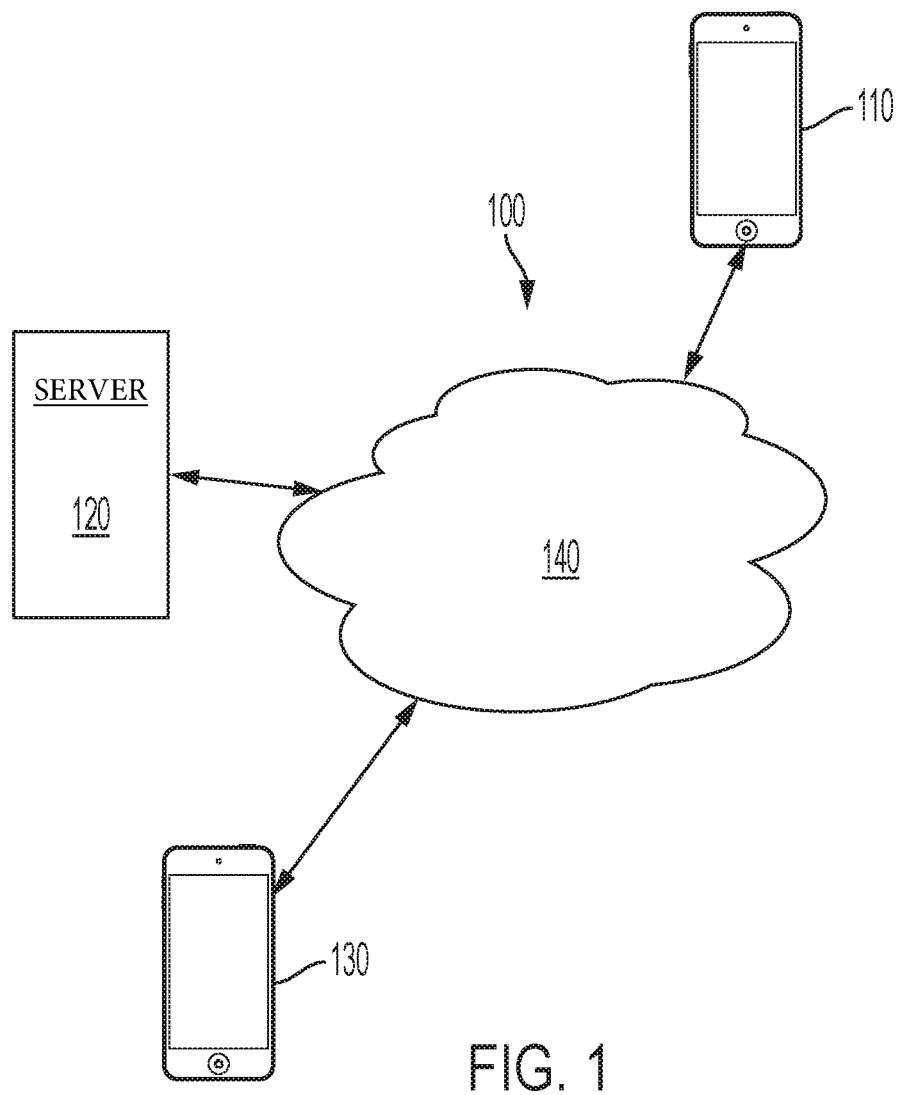
FIG. 1 is a block diagram of the data flow between the components of a system for establishing and controlling a direct video output feed from a selected remote device in accordance with the present invention.

Referring now to the drawings and in particular FIG. 1, a system 100 for establishing and controlling a direct video output feed from a selected remote device includes a requesting handheld device 110, a server computer system 120, and a remote capturing device 130. The requesting handheld device 110 may be embodied as a conventional smartphone. The remote capturing device 130 may be embodied as a conventional smartphone. In embodiments wherein the remote capturing device 130 is a smartphone, both the requesting handheld device 110 and the remote capturing device 130 may include a housing with a touchscreen display which provides both tactile input and visual output functionality, internal processing components, a camera system, a movement sensing system, a geo-spatial positioning system, wireless communication functionality and software which enables it to control the operation of its components. The camera system may define one or a plurality of cameras which operate to selectively capture still images and/or video. The movement sensing system may include one or a plurality of accelerometers, gravity sensors, gyroscopes, and rotational vector sensors. The geo-spatial positioning system may be defined by a satellite navigation system. And the wireless communication functionality may include a digital cellular network components, wireless local area networking components and/or personal area networking components which may be utilized to enable the device to transmit and receive data over the Internet 140.

The server computer system 120 may be defined by a single computer system or a collection of computer systems working in concert. The server computer system 120 may be may be located as a location controlled by an administrator of the system for establishing and controlling a direct video output feed 100 or in a cloud based location. In any event, the server computer system 120 includes computer networking components which allows it to transmit and receive data over the Internet 140. As such, the server computer system 120, the requesting handheld device 110, and the capturing handheld device 130 are each communicatively connected by way of the Internet 140 (or other computer network) no matter where each component is located.

Figure 2:
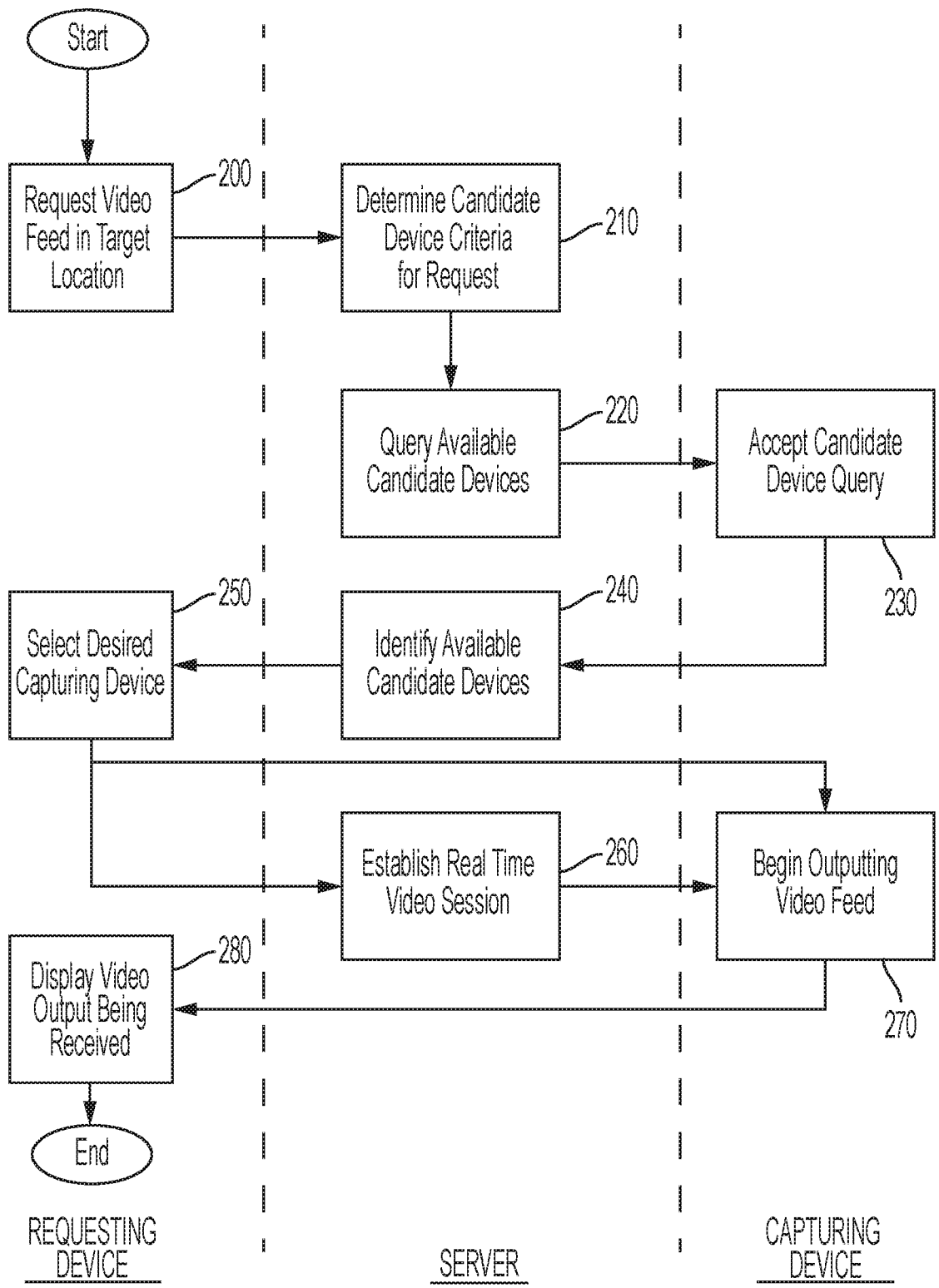
FIG. 2 shows the process through which a system for establishing and controlling a direct video output feed from a selected remote device establishes a direct video output feed in accordance with the present invention.

Referring now to FIG. 2, the system for establishing and controlling a direct video output feed from a selected remote device establishes a direct video output feed begins when a requesting handheld device initiates a request for a real time video feed at step 200. The request may specify a particular target location, a specific time that the video is desired (if the time is not as soon as possible), and the duration that the video feed is desired. The request may also include desired constraints concerning a desired proximity to the target location (and/or a minimum acceptable threshold distance for proximity) and/or a desired camera resolution or other desired camera technical characteristics for the video feed.

The request is transmitted to a server computer system at step 210. The server computer system then initiates a query to recognize remote devices which may be a candidate to fulfill the request and be a remote capturing device for the request ("candidate remote devices") at step 220. The query step may include both an internal query analysis and a query transmission to potential candidate remote devices. For example, the internal query analysis may include the server computer system searching its records of remote devices which have previously registered to operate as remote capturing devices with the server computer system to determine which of these devices meet or exceed any specified desired constraints. For proximity requirements relative to the target location, this may include determining the current location of registered devices and/or identifying any registered devices which have specified that they are or will be available in an area which includes the target location. For camera technical characteristics, this would include identifying which registered devices have a camera that meets the requirement.

It is contemplated that this step ensures that the pool candidate remote devices from which a remote capturing device is selected (as described below) only includes devices within a threshold proximity of the target location so as to be able to capture video thereof.

It is further contemplated that this step may also include determining the vantage point (ground level/elevation) and line of sight of candidate remote devices.

Once the internal query analysis is complete (or if no internal query analysis is performed), the query transmission is sent by the server computer system to candidate handheld devices. It is appreciated, however, that the internal query analysis may allow the server to narrow down how many candidate handheld devices will receive the query transmission, sending it only to candidate handheld devices which could realistically fulfill the request.

For any given candidate remote device which accepts the query transmission, that candidate remote device transmits an accept transmission to the server computer system at step 230. The server computer system then designates and lists all candidate remote devices that have accepted the query transmission as available candidate remote devices at step 240. This listing is then provided to the requesting handheld device to allow the requesting handheld device to select from the available candidate remote devices.

In conjunction with listing all candidate remote devices, the server computer system may additionally prioritize the how the candidate remote devices are presented to a user. In this regard, the server computer system may evaluate candidate remote devices which have accepted the query transmission and algorithmically rank them in a listing based on factors such as past performances of relevant candidate remote devices (as determined from feedback provided by prior requesting handheld devices that have used a given relevant candidate remote device), familiarity and/or expertise as it relates to the target location or an object/occurrence at the target location (as it relates to the operator of a given relevant candidate remote device, which may be determined based on information provided during registration), compensation demanded for performing services as a remote capturing device, actual distance from and/or vantage point and line of sight relative to the target location, The requesting handheld device selects one of, or in other embodiments a plurality of, the available candidate remote device to become the remote capturing device at step 250. This selection is transmitted to the server computer system and the selected remote capturing device. The server computer system then administrates the establishment of a real time communications session involving the transmission of the real time video feed being captured by the camera of the remote capturing device to the requesting handheld device at step 260. Session Initiation Protocol may be employed to initiate, maintain, and terminate the real time communications session.

When the remote capturing device receives the selection, the remote capturing device begins to prepare to be used for the provision of a video feed. This may include executing instructions through software that prepares for an incoming real time communications session activates the camera in video capture mode and begins tracking the output of the movement sensing system and the spatial positioning system. This may further include executing instructions through software that temporarily disables certain other software applications present on the capturing handheld device, such as messaging and calling applications and web browsing applications, and/or temporarily locks the output of a display screen of the remote capturing device so that it only can display the real time video feed being captured by its camera and other indicia generated that are a part of the real time communications session.

With the remote capturing device capturing video, as soon as the real time communications session established, the remote capturing device begins outputting the feed of captured video by way of the real time communications session to the requesting handheld device at step 270. This output is received by the requesting handheld device through the real time communications session and displayed on the display screen of the requesting handheld device at step 280, thereby establishing the direct video output feed on the requesting handheld device.

It is contemplated that beyond having the direct video output feed being shown on the display screen of the requesting handheld device, it is desirable for the requesting handheld device to be able to exert some influence over the manner in which the video feed is being captured. As such, the real time communications session includes functionality which allows the requesting handheld device to generate commands on and or to the remote capturing device to provide instruction or guidance for the capturing of the video feed.

That said, it is additionally contemplated that the real time communications session may only include a video feed from the remote capturing device to the requesting handheld device; with no video feed being provided from the requesting handheld device to the remote capturing device. Advantageously, this may provide for more effective delivery of the direct video output feed from the remote capturing device because bandwidth is not being used to provide bidirectional video feeds.

Figure 3:
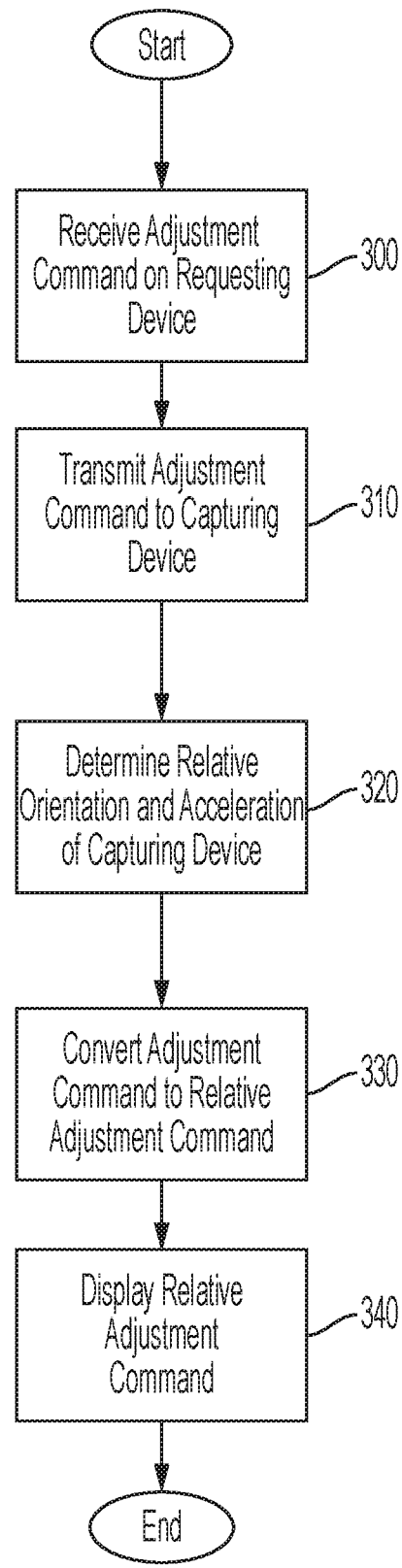
FIG. 3 shows the process through which a system for establishing and controlling a direct video output feed from a selected remote device exerts control on a direct video output feed in accordance with the present invention.

Referring now to FIG. 3, the system for establishing and controlling a direct video output feed from a selected remote device provides for control of a direct video output feed with the requesting handheld device first receiving an adjustment command at step 300. The adjustment command may be received as an input on the requesting handheld device by way of gestures on the display screen of the requesting handheld device. For example, a one point (i.e., one finger) swipe left gesture on the display screen may be received as a move the camera (by moving the phone) left adjustment command, a one point swipe right gesture on the display screen may be received as a move the camera right adjustment command, a one point swipe up gesture on the display screen may be received as a move the camera up adjustment command, a one point swipe down gesture on the display screen may be received as a move the camera down adjustment command, a two point swipe up gesture on the display screen may be received as a move the camera closer (i.e., walk forward) adjustment command, a two point swipe down gesture on the display screen may be received as a move the camera further away adjustment command. Similarly, a one point tap on the display screen may be received as a center the camera on the tapped location adjustment command.

In addition, some commands may be able to be directly implemented without requiring further action by the user of the remote capturing device. For example, a pinch inwards gesture on the display screen of the requesting handheld device may be received as an adjustment command which causes the camera of the remote capturing device to zoom in and a pinch outwards gesture on the display screen of the requesting handheld device may be received as an adjustment command which causes the camera of the remote capturing device to zoom out.

Similarly, adjustment commands may be received as an input on the requesting handheld device by way of movements of the requesting handheld device which are tracked by the movement sensing system of the requesting handheld device and/or or the tapping of one or more icons on the display screen of the requesting handheld device. For example, physically moving the requesting handheld device left, right, up, or down may be received, respectively speaking, as a move the camera (by moving the phone) left, right, up, or down adjustment command. It is contemplated that such commands may be generated any time the device is moved in such a manner or if the device is moved in such a manner as the requesting handheld device is primed to receive an adjustment command (by, for example, the user touching the display screen while doing so). Software generated actuators (i.e., buttons) on the display screen of the requesting handheld device may be used to generate adjustment commands by having specific actuators permanently or selectively available on the display screen which, when pressed or actuated in some manner, are directly received as an adjustment command. The actuators may include icons present thereon which indicate the type of adjustment command that they pertain to.

Once an adjustment command is received on the requesting handheld device, the adjustment command is transmitted by way of the real time communications session to the remote capturing device at step 310. Once an adjustment command is received, the remote capturing device determines its relative orientation and acceleration as opposed to the requesting handheld device at step 320. Through this step, the remote capturing device is able to translate what type of motion corresponds to any directional instruction in the adjustment command relative to the position of the remote capturing device, as determined by its movement sensing system and spatial positioning system. Essentially, because the command that is intended for the remote capturing device is being generated on a discrete handheld device which may not be being held in the same orientation or moved at the same speed or in the same direction at a given moment as the remote capturing device, this step may be necessary to make sure the correct relative movement may be instructed, particularly when physical motion is being used to generate adjustment commands.

Once the relative orientation and acceleration of the remote capturing device is determined, the adjustment command is converted to a relative adjustment command which accounts for the present planar orientation and motion of the remote capturing device at step 330. This relative adjustment command is then displayed as an indicia on the display screen of the remote capturing device at step 340, enabling an operator of the remote capturing device to move the remote capturing device to reposition the remote capturing device and/or its camera system in accordance with the instruction which defines the adjustment command. The indicia may be defined as an arrow or other visual directive.

It is contemplated that the remote capturing device 130 may alternatively be embodied as a unmanned aerial vehicle, a telepresence robot, or another alternate device that includes at minimum a camera system and can access a computer network. In embodiments wherein the remote capturing device is not a handheld device, the adjustment commands may be automatically implemented by the operating software on the remote capturing device.

It is additionally contemplated that the requesting handheld device may alternatively be a embodied as a desktop or laptop computer system.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for establishing and controlling a direct video output feed from a selected remote device, comprising the steps of:
   requesting by a first handheld device a remote video feed, wherein the step of requesting includes identifying at least a target and the first handheld device includes a first visual output component;
   following the step of requesting, establishing a real time communications session between the first handheld device and a remote device, wherein the real time communications session is adapted to allow the transmission of data representing video from the remote device to the first handheld device;
   generating by the remote device a video feed related to the target, wherein the step of generating includes capturing video from a camera system on the remote device;
   following the step of establishing, transmitting by the remote device the video feed in real time to the first handheld device, wherein the step of transmitting utilizes the real time communications session;
   as the step of transmitting occurs, displaying by the first handheld device the video feed in real time on the first visual output component;
   as the step of displaying by the first handheld device occurs, receiving an adjustment command on the first handheld device, wherein the adjustment command is defined by an intended change to manner in which the video feed is being generated and the remote device is defined by a second handheld device that includes a second visual output component; and
   displaying on the second visual output component an indicia related to the adjustment command.

2. The method of claim 1, wherein the adjustment command is received on the first handheld device by way of at least one gesture being performed on the first visual output component.

3. The method of claim 1, wherein the adjustment command is received on the first handheld device by way of the first handheld device being physically moved.

4. The method of claim 1, wherein the adjustment command is received on the first handheld device by way of an actuator present on the first visual output component being manually engaged.

5. The method of claim 1, additionally comprising the steps of:
   transmitting the adjustment command from the first handheld device to the second handheld device; and
   determining at least one of a relative orientation and acceleration of the second handheld device respective to the first handheld device, wherein the steps of transmitting the adjustment command and determining at least one of a relative orientation and acceleration of the second handheld device are performed prior to the step of displaying on the second visual output.

6. A method for establishing and controlling a direct video output feed from a selected remote device, comprising the steps of:
   requesting by a first handheld device a remote video feed, wherein the step of requesting includes identifying at least a target and the first handheld device includes a first visual output component;
   following the step of requesting, establishing a real time communications session between the first handheld device and a remote device, wherein the real time communications session is adapted to allow the transmission of data representing video from the remote device to the first handheld device;
   generating by the remote device a video feed related to the target, wherein the step of generating includes capturing video from a camera system on the remote device;
   following the step of establishing, transmitting by the remote device the video feed in real time to the first handheld device, wherein the step of transmitting utilizes the real time communications session;
   as the step of transmitting occurs, displaying by the first handheld device the video feed in real time on the first visual output component; and
   querying at least one candidate remote device which is capable of providing the remote video feed, wherein the step of querying is performed prior to the step of establishing, the target has a target geo-spatial location, and the step of querying includes evaluating the geo-spatial location of the at least one candidate remote device relative to the location of the target to ensure the at least one candidate remote device being evaluated is within a threshold proximity of the target geo-spatial location.

7. A method for establishing and controlling a direct video output feed from a selected remote device, comprising the steps of:
   requesting by a first handheld device a remote video feed, wherein the step of requesting includes identifying at least a target and the first handheld device includes a first visual output component;
   following the step of requesting, establishing a real time communications session between the first handheld device and a remote device, wherein the real time communications session is adapted to allow the transmission of data representing video from the remote device to the first handheld device;
   generating by the remote device a video feed related to the target, wherein the step of generating includes capturing video from a camera system on the remote device;
   following the step of establishing, transmitting by the remote device the video feed in real time to the first handheld device, wherein the step of transmitting utilizes the real time communications session; and
   as the step of transmitting occurs, displaying by the first handheld device the video feed in real time on the first visual output component, wherein the real time communications session is adapted to not allow the transmission of data representing video from the first handheld device to the remote device.

8. A method for establishing and controlling a direct video output feed from a selected remote device, comprising the steps of:
   requesting by a first handheld device a remote video feed, wherein the step of requesting includes identifying at least a target having a location and the first handheld device includes a first visual output component;
   following the step of requesting, querying at least one candidate handheld device which is capable of providing the remote video feed;

following the step of querying, establishing a real time communications session between the first handheld device and a second handheld device, wherein the real time communications session is adapted to allow the transmission of data representing video only from the second handheld device to the first handheld device;

generating by the second handheld device a video feed related to the target, wherein the step of generating includes capturing video from a camera system on the second handheld device;

following the step of establishing, transmitting by the second handheld device the video feed in real time to the first handheld device, wherein the step of transmitting utilizes the real time communications session;

as the step of transmitting occurs, displaying by the first handheld device the video feed in real time on the first visual output component;

as the step of displaying by the first handheld device occurs, receiving an adjustment command on the first handheld device, wherein the adjustment command is defined by an intended change to manner in which the video feed is being generated and the second handheld device includes a second visual output component; and displaying on the second visual output component an indicia related to the adjustment command.

9. The method of claim 8, wherein the adjustment command is received on the first handheld device by way of at least one gesture being performed on the first visual output component.

10. The method of claim 8, wherein the adjustment command is received on the first handheld device by way of the first handheld device being physically moved.

11. The method of claim 8, wherein the adjustment command is received on the first handheld device by way of an actuator present on the first visual output component being manually engaged.

12. The method of claim 8, additionally comprising the steps of:

transmitting the adjustment command from the first handheld device to the second handheld device; and determining at least one of a relative orientation and acceleration of the second handheld device respective to the first handheld device, wherein the steps of transmitting the adjustment command and determining at least one of a relative orientation and acceleration of the second handheld device are performed prior to the step of displaying on the second visual output.

13. A method for establishing and controlling a direct video output feed from a selected remote device, comprising the steps of:

requesting by a first handheld device a remote video feed, wherein the step of requesting includes identifying at least a target having a location and the first handheld device includes a first visual output component;

following the step of requesting, querying at least one candidate handheld device which is capable of providing the remote video feed;

following the step of querying, establishing a real time communications session between the first handheld device and a second handheld device, wherein the real time communications session is adapted to allow the transmission of data representing video only from the second handheld device to the first handheld device;

generating by the second handheld device a video feed related to the target, wherein the step of generating includes capturing video from a camera system on the second handheld device;

following the step of establishing, transmitting by the second handheld device the video feed in real time to the first handheld device, wherein the step of transmitting utilizes the real time communications session;

as the step of transmitting occurs, displaying by the first handheld device the video feed in real time on the first visual output component; and wherein the step of querying includes evaluating the location of the at least one candidate handheld device relative to the location of the target.

14. A method for establishing and controlling a direct video output feed from a selected remote device, comprising the steps of:

requesting by a first handheld device a remote video feed, wherein the step of requesting includes identifying at least a target having a location and the first handheld device includes a first visual output component;

following the step of requesting, querying a plurality of candidate handheld devices which are each capable of providing the remote video feed, wherein the step of querying includes evaluating the location of at least one of the candidate handheld devices relative to the location of the target;

following the step of querying, establishing a real time communications session between the first handheld device and a second handheld device, wherein the real time communications session is adapted to allow the transmission of data representing video only from the second handheld device to the first handheld device and the second handheld device is among the plurality of candidate handheld devices queried in the step of querying;

generating by the second handheld device a video feed related to the target, wherein the step of generating includes capturing video from a camera system on the second handheld device;

following the step of establishing, transmitting by the second handheld device the video feed in real time to the first handheld device, wherein the step of transmitting utilizes the real time communications session;

as the step of transmitting occurs, displaying by the first handheld device the video feed in real time on the first visual output component;

as the step of displaying by the first handheld device occurs, receiving an adjustment command on the first handheld device, wherein the adjustment command is defined by an intended change to manner in which the video feed is being generated and the second handheld device includes a second visual output component; and displaying on the second visual output component an indicia related to the adjustment command.

15. The method of claim 14, wherein the adjustment command is received on the first handheld device by way of at least one gesture being performed on the first visual output component.

16. The method of claim 14, wherein the adjustment command is received on the first handheld device by way of the first handheld device being physically moved.

17. The method of claim 14, wherein the adjustment command is received on the first handheld device by way of an actuator present on the first visual output component being manually engaged.

18. The method of claim 14, additionally comprising the steps of:

transmitting the adjustment command from the first handheld device to the second handheld device; and determining at least one of a relative orientation and acceleration of the second handheld device respective to the first handheld device, wherein the steps of transmitting the adjustment command and determining at least one of a relative orientation and acceleration of the second handheld device are performed prior to the step of displaying on the second visual output.

\* \* \* \* \*